US009531288B2

(12) United States Patent
Bush et al.

(10) Patent No.: US 9,531,288 B2
(45) Date of Patent: Dec. 27, 2016

(54) SYSTEMS AND METHODS FOR BALANCING UPS OUTPUT VOLTAGES DURING TRANSITIONS BETWEEN OPERATING MODES (71) Applicant: Liebert Corporation, Columbus, OH (US)

(72) Inventors: Terry D. Bush, Westerville, OH (US); Brian P. Heber, Delaware, OH (US); Russell E. Shetler, Jr., Delaware, OH (US)

(73) Assignee: Liebert Corporation, Columbus, OH (US)

( * ) Notice: Subject to any disclaimer, the term of this patent is extended or adjusted under 35 U.S.C. 154(b) by 509 days.

(21) Appl. No.: 14/078,884

(22) Filed: Nov. 13, 2013

(65) Prior Publication Data

US 2014/0139022 A1    May 22, 2014

Related U.S. Application Data (60) Provisional application No. 61/729,056, filed on Nov. 21, 2012.

(51) Int. Cl.
*H02M 5/40* (2006.01)
*H02J 3/24* (2006.01)

(52) U.S. Cl.
CPC .................. *H02M 5/40* (2013.01); *H02J 3/24* (2013.01); *Y10T 307/406* (2015.04)

(58) Field of Classification Search
CPC .......... H02M 5/40; H02J 3/24; Y10T 307/406
USPC ......................................................... 307/64
See application file for complete search history.

(56) References Cited

U.S. PATENT DOCUMENTS

| 3,665,495 | A | * | 5/1972 | Carter | ..................... | H02J 9/066 |
| | | | | | | 290/4 R |
| 4,465,943 | A | * | 8/1984 | Risberg | .................. | H02J 9/066 |
| | | | | | | 307/127 |
| 5,289,046 | A | * | 2/1994 | Gregorich | ............... | H02J 9/062 |
| | | | | | | 307/64 |
| 5,612,580 | A | * | 3/1997 | Janonis | ................... | H02J 9/062 |
| | | | | | | 307/64 |

(Continued)

OTHER PUBLICATIONS

U.S. Appl. No. 13/465,273, filed May 7, 2012.
U.S. Appl. No. 14/078,909, filed Nov. 13, 2013.

*Primary Examiner* — Jared Fureman
*Assistant Examiner* — Emmanuel R Dominique
(74) *Attorney, Agent, or Firm* — Harness, Dickey & Pierce, P.L.C.

(57) ABSTRACT

A UPS includes an input that receives first power from a utility source to power a load and receives second power from the utility source. The load is separate from the UPS. An inverter receives when in a first mode, the first and second power and when in a second mode, the second power and not the first power. The second power is used to power the inverter. A bypass circuit is connected to the input and bypasses the inverter to supply the first power to an output of the UPS when operating in the second mode. A control module detects a voltage at the output of the UPS, integrates the voltage to generate a first sum, and subsequent to completing a transition between the first and second modes, adjusts an output voltage of the inverter based on the first sum to balance the voltage of the UPS.

23 Claims, 9 Drawing Sheets (56) References Cited

U.S. PATENT DOCUMENTS

| | | | |
|---|---|---|---|
| 6,327,162 B1 * | 12/2001 | Larsen | H02J 3/1814 |
| | | | 307/103 |
| 6,917,124 B2 * | 7/2005 | Shetler, Jr. | H02J 9/061 |
| | | | 307/66 |
| 7,888,818 B2 * | 2/2011 | Taylor | H02J 9/062 |
| | | | 307/64 |
| 2003/0025397 A1 * | 2/2003 | Young | H02J 3/32 |
| | | | 307/64 |
| 2003/0048006 A1 * | 3/2003 | Shelter, Jr. | H02J 9/061 |
| | | | 307/64 |
| 2006/0043792 A1 * | 3/2006 | Hjort | H02J 9/062 |
| | | | 307/1 |
| 2010/0097169 A1 | 4/2010 | Earle | |
| 2011/0043303 A1 | 2/2011 | Herron et al. | |
| 2012/0074786 A1 * | 3/2012 | Johnson, Jr. | H02J 9/062 |
| | | | 307/66 |
| 2014/0139022 A1 | 5/2014 | Bush et al. | |
| 2015/0155793 A1 * | 6/2015 | Chen | H02M 1/12 |
| | | | 363/37 |

* cited by examiner

SYSTEMS AND METHODS FOR BALANCING UPS OUTPUT VOLTAGES DURING TRANSITIONS BETWEEN OPERATING MODES

CROSS-REFERENCE TO RELATED APPLICATIONS

This application claims the benefit of U.S. Provisional Application No. 61/729,056 filed on Nov. 21, 2012. The entire disclosure of the above application is incorporated herein by reference.

FIELD

The present disclosure relates to generally uninterruptible power supplies (UPSs), and more particularly to output voltage balancing of an UPS.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Uninterruptible power supplies (UPSs) are used in supplying power to data centers. An electric utility substation downconverts utility power to generate substation power that is supplied to the UPSs, which condition the substation power. The UPSs provide back-up power to the data centers in the event of interruption of power from an electric utility and/or substation. Each of the UPSs may have a source of backup power. The UPSs may supply power to, for example, one or more power supplies of one or more servers of the data center.

A data center may have multiple loads (e.g., servers). Each of the loads has a power supply (load power supply) that may operate over a range of input voltages. One or more UPSs may be used to provide output voltage(s) to the load power supplies of the data center. The UPSs receive power from a substation at a substation voltage (e.g., 208 VAC) and may each be configured to provide output power at a fixed nominal output voltage. The UPSs may have an UPS (or inverter) mode and a bypass mode. When in the UPS mode, the UPSs may regulate, filter and condition a substation voltage to provide the output power.

Each of the UPSs may include a bypass switch that, when in the bypass mode, is in a bypass state (e.g., closed). The power from the utility at the substation voltage is provided directly to the load power supplies when the UPS is in the bypass mode without regulating, filtering and/or conditioning the substation voltage. During the bypass mode, the rectifier and inverter of the UPS may be powered down. The UPS may be in the bypass mode when, for example, a failure occurs in the UPS or the input power from the utility is clean enough that conditioning is not required. In the bypass mode, components (e.g., transformers, rectifier(s), inverter(s), etc.) of the UPS are bypassed to provide the power from the utility at the substation voltage directly to the output of the UPS and thus directly to the load power supplies.

An UPS can include a utility source input, a rectifier, an inverter, a bypass circuit and an output. Utility power is provided to the utility source input. When in the UPS mode, the power is conditioned via the rectifier and inverter prior to being provided to the output. When in the bypass mode, the power is directly provided to the output via the bypass circuit.

In addition to operating in an UPS mode and a bypass mode, an UPS may also operate in an economy mode. Different economy modes may be implemented. During a first example economy mode, the bypass switch is closed and output power of an UPS is provided via the bypass switch to a load. An inverter and/or a control module of the UPS are ON and monitor the output power of the UPS. In the economy mode, less power is consumed by the UPS than when operating in the UPS mode. This is because a rectifier of the UPS and the inverter are operating in an idle mode. While in the idle mode, the inverter is not providing power or is providing minimal power to an output of the UPS. The inverter and/or control module may switch from operating in the economy mode to the UPS mode based on the monitored output power. If the output power is noisy and/or a corresponding voltage of the output power is outside a predetermined range, the inverter and/or control module may switch from the economy mode to the UPS mode.

During a second example economy mode, the bypass switch is closed and output power of an UPS is provided via the bypass switch to a load. An inverter and/or control module of the UPS monitors the output power. Based on the output power, the inverter may supply a portion of the power supplied to the load to cancel harmonics in the power supplied via the bypass switch. The power supplied via the inverter includes harmonics to cancel the harmonics in the power supplied via the bypass switch. Although the inverter consumes more power than when operating in an idle mode, the inverter cleans the output power of the UPS while consuming less power than when operating in the UPS mode.

SUMMARY

In one aspect, an uninterruptible power supply (UPS) is provided and includes an input, an inverter, a bypass circuit, and a control module. The input is configured to (i) receive first power from a utility source to power at least one load, and (ii) receive second power from the utility source. The at least one load is separate from the UPS. The inverter is configured to receive (i) when in a first mode, the first power and the second power, and (ii) when in a second mode, the second power and not the first power. The second power is used to power the inverter. The bypass circuit is connected to the input and is configured to bypass the inverter to supply the first power to an output of the UPS when operating in the second mode. The control module is configured to, (i) detect a voltage at the output of the UPS, (ii) integrate the voltage to generate a first sum, and (iii) subsequent to completing a transition from the second mode to the first mode, adjust an output voltage of the inverter based on the first sum to balance the voltage of the UPS. The voltage of the UPS is provided based on the output voltage of the inverter.

In another aspect, a method of operating an uninterruptible power supply (UPS) is provided. The method includes: receiving first power from a utility source at an input of the UPS to power at least one load, where the at least one load is separate from the UPS; receiving second power at the input from the utility source; and receiving, via an inverter, (i) the first power and the second power when in a first mode, and (ii), the second power and not the first power when in a second mode, where the second power is used to power the inverter. The method further includes: bypassing the inverter to supply the first power to an output of the UPS when operating in the second mode; detecting a voltage at the output of the UPS; integrating the voltage to generate a first sum; and subsequent to completing a transition from the second mode to the first mode, adjusting an output voltage of the inverter based on the first sum to balance the voltage of the UPS, wherein the voltage of the UPS is provided based on the output voltage of the inverter.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
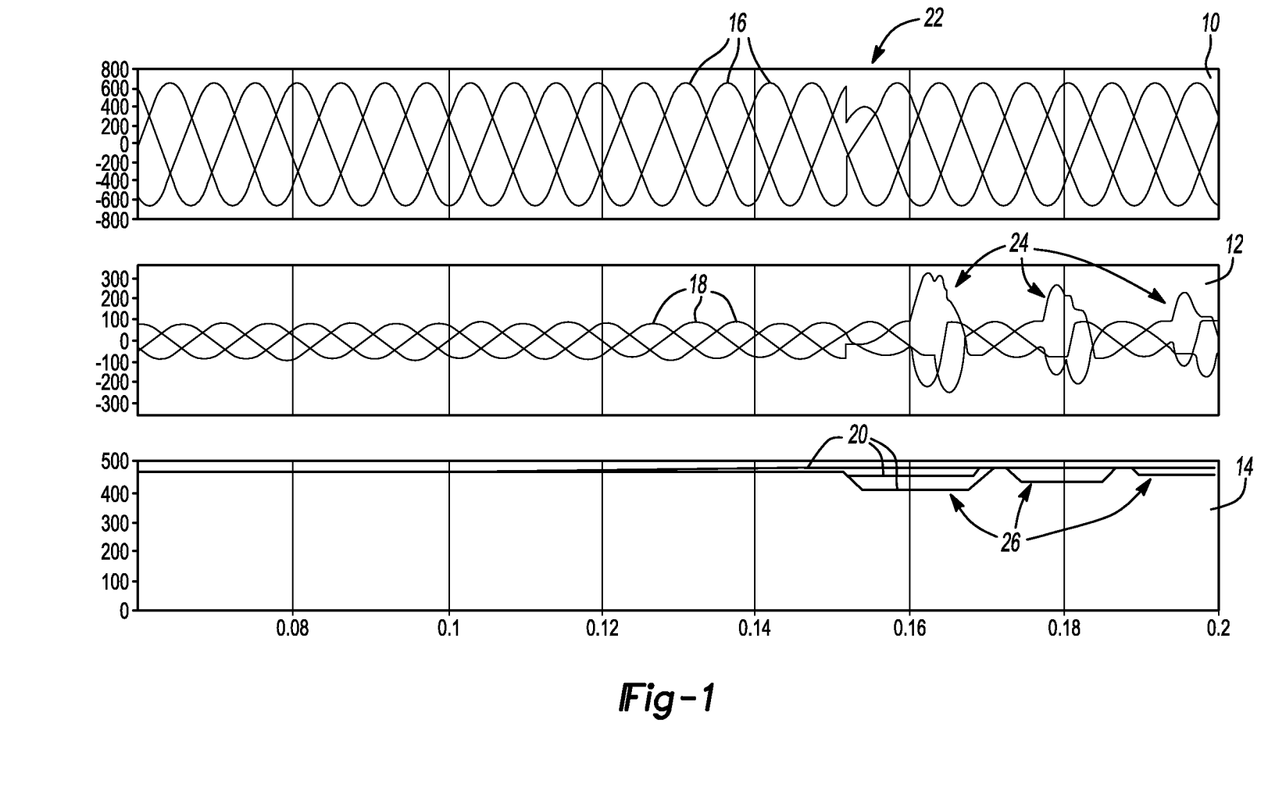
FIG. 1 includes voltage and current plots illustrating UPS output voltage and current irregularities during a transition from an economy mode to an UPS mode.

In FIG. 1, voltage plots are shown illustrating UPS output voltage irregularities during a transition from an economy mode to an UPS mode. AN UPS may operate in the economy mode while supplying power to downstream distribution transformers (hereinafter referred to as transformers). A bypass switch of the UPS may be closed and power may be supplied from a utility source through the bypass switch directly to the transformers. This power may be referred to as bypass power. Due to a detected fault in the bypass power supplied via the bypass circuit, the UPS may transition from the economy mode to the UPS mode. During this transition, voltages of phases of output power of the UPS can fluctuate due to, for example, a ground fault. Examples of these fluctuations (or temporary irregularities) are shown in the plots of FIG. 1.

FIG. 1 includes three plots 10, 12, 14. The first plot 10 illustrates voltage waveforms 16 for three phases of the output power of the UPS. The three phases are sinusoidal and 120° out-of-phase with each other. The second plot 12 illustrates corresponding output current waveforms 18 for the three phases. The third plot 14 illustrates root-mean-square (RMS) output voltage waveforms 20 of the three phases.

During the transition from the economy mode to the UPS mode, the fault causes disturbances in one or more of the phases such that the one or more phases temporarily do not exhibit a sinusoidal waveform. Voltage magnitudes of the one or more phases may be less than voltage magnitudes typically exhibited when there is not a fault. The voltage disturbances are shown at 22. As a result, the output voltages of the UPS are unbalanced (i.e. non-symmetrical around zero). A voltage waveform is unbalanced when an area between positive voltages of the voltage waveform and zero are different than an area between negative voltages of the voltage waveform and zero. These voltage disturbances and/or unbalanced conditions create magnetic flux (hereinafter referred to as flux) imbalance in the downstream transformers. The flux imbalance can result in saturation currents in the downstream transformers of 3-7 times full load ratings of the downstream transformers. The increased and/or saturation currents are shown at 24. If the downstream transformers draw a full kilo-volt-ampere (kVA) rating of the UPS, the saturation current can overload the UPS and prevent the inverter from properly being able to supply an adequate amount of current to the downstream transformers.

In addition, the second and third plots 12, 14 illustrate that the saturation currents and corresponding RMS voltage sag periods 26 can continue to occur for multiple periods of time after the initial voltage disturbances 22. Although the magnitudes of the saturation currents and magnitude changes in RMS voltage decay over time, the saturation currents and RMS voltage sags can occur for multiple periods of time.

The implementations disclosed herein provide inverter output control to balance output voltages of an UPS during transitions between operating modes. This prevents downstream transformer current saturation. The downstream transformer current saturation can be prevented when faults in bypass power occur.

Figure 2:
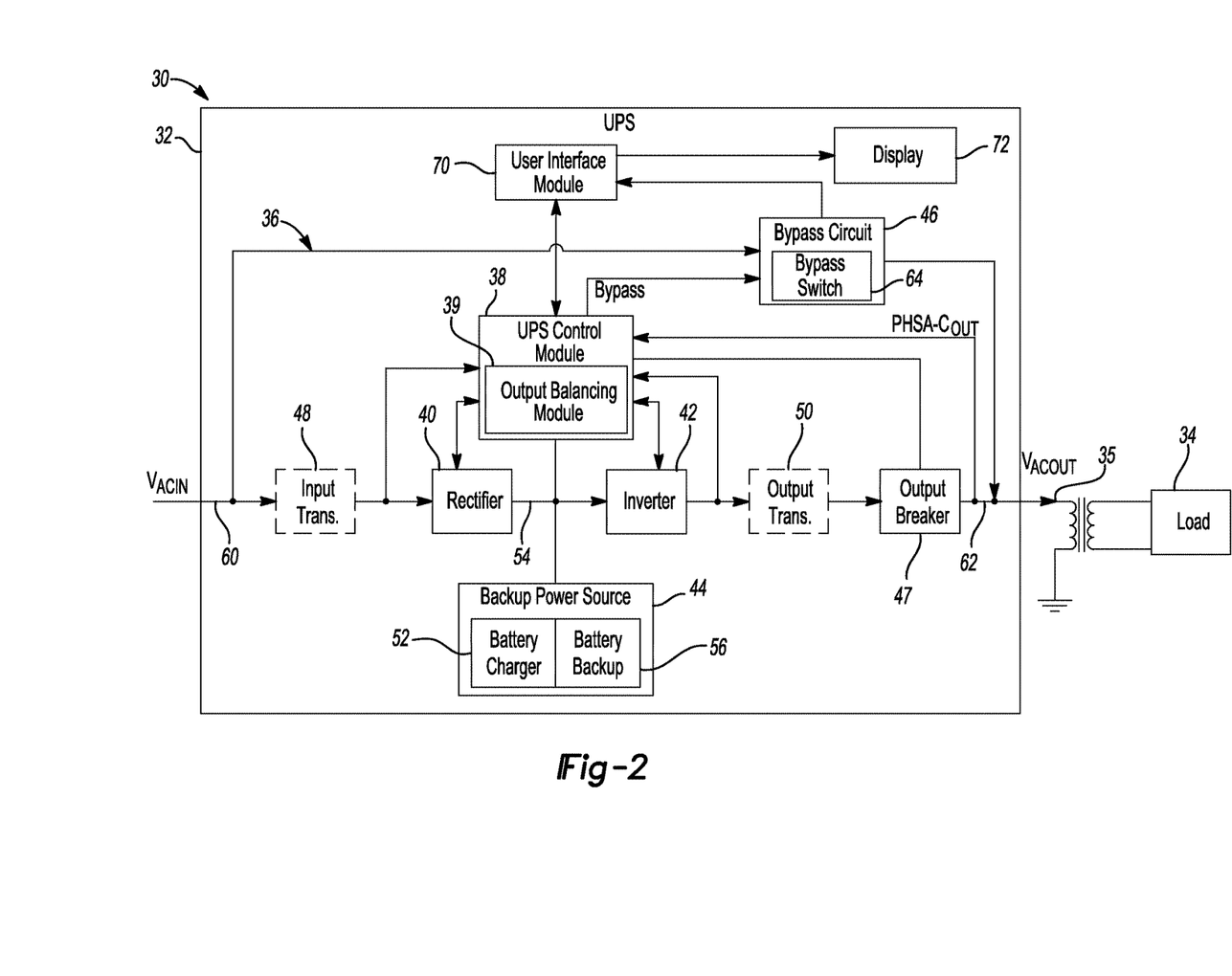
FIG. 2 is a functional block diagram of an UPS system incorporating an output balancing module in accordance with one aspect of the present disclosure.

In FIG. 2, an UPS system 30 is shown. The UPS system 30 may include one or more UPSs (one UPS 32 is shown) that supply AC power to one or more loads (one load 34 is shown) via one or more distribution transformers (one distribution transformer 35 is shown). Each of the UPSs may supply power to one or more loads. The UPSs may be connected in parallel to provide more power capacity. The load(s) may include, for example, one or more server power supplies, network switches and devices, telecommunication switches and devices, audio/video hubs and devices, air conditioning units, medical devices and equipment, industrial devices and equipment, etc.

The UPS 32 may operate in various modes including an UPS mode, a back-up mode, a bypass mode, and one or more economy modes. These operating modes are described below with respect to the elements of FIGS. 2 and 3. The UPS 32 includes an UPS power circuit 36 and an UPS control module 38 with an output balancing module 39. The output balancing module 39 balances output voltages of the UPS 32 subsequent to an initiated transition between operating modes. As a result, the balancing of the output voltages is performed during and/or subsequent to the transition between the operating modes. As an example, the transition may be from the economy mode to the UPS mode. Although the balancing of the output voltages is primarily described herein with transitions between the economy mode and the UPS mode, the balancing may be performed when transitioning between other operating modes.

The UPS power circuit 36 includes a rectifier 40 and an inverter 42. The UPS 32 also includes a backup power source 44 and a bypass circuit 46. The UPS power circuit 36 may also include an input transformer 48 and/or an output transformer 50, as shown. The UPS 32 may not include the transformers 48, 50.

The UPS control module 38 may be included in the inverter 42 or may be separate from the inverter 42, as shown. The UPS control module 38 may include a digital signal processor with embedded software that detects current, voltage and power parameters in the UPS power circuit 36. The UPS control module 38 monitors inputs and outputs of devices in UPS 32, and controls operation of the UPS power circuit 36, backup power source 44, a bypass circuit 46, and an output breaker 47 based on the inputs and outputs.

The UPS control module 38 may control operation of rectifiers, inverters, transformers, chargers and other circuit elements of the UPS power circuit 36, such as switching power devices (not shown). The UPS control module 38 may, for example: select and set a mode of operation and maintain voltage and current levels at the output of the UPS 32 and thus on the load 34. The UPS control module 38 may also provide limits (e.g., limiting current supplied to the load 34), set fault conditions, set event conditions, and set alarm conditions and control operation of the UPS 32 based on these conditions.

The rectifier 40, the inverter 42 and the transformers 48, 50 are connected in series between a main AC source (e.g., substation voltage source, regulated utility power source, generator, fuel cell, etc.) and the load 34. The main AC source supplies AC power to the input transformer 48, which in turn supplies AC power to the rectifier 40. The rectifier 40 functions as an AC/DC converter and converts AC to DC, which is provided to a DC bus 54. The DC bus 54 is coupled to an output of rectifier 40 and to an input of the inverter 42. The inverter 42 functions as a DC/AC converter and converts DC on the DC bus 54 to AC that is provided at an output of the inverter 42. The backup power source 44 provides power for the load 34 (for example, by providing a backup source of DC) when power from the main AC source is lost or is sufficiently degraded (e.g., improper voltage level, improper current levels, etc.) such that it can't be used. The backup power source 44 may include one or more of a backup battery (which may be a battery bank), a flywheel, a fuel cell, etc.

When the UPS 32 is operating in the UPS mode, power is supplied to the load 34 from the main AC source through the rectifier 40 and the inverter 42. This provides regulated and filtered power with minimal irregularities, such as voltage spikes, frequency deviations or phase deviations. In one circuit topology, the rectifier 40 provides power to the inverter 42 and to a battery charger 52 of the backup power source 44 via a DC bus 54. The rectifier 40 may be a pulse width modulated (PWM) rectifier. The battery charger 52 charges, for example, battery backup 56. In another topology, when the battery backup is directly connected to the DC bus 54, the rectifier 40 may be a phase controlled rectifier and used to charge the battery backup without use of a separate battery charger.

Continuing from the same example, when power from the main AC source is interrupted, the UPS 32 switches to the back-up mode and power is supplied from the backup power source 44 to the inverter 42 instead of from the main AC source. This allows power to be maintained on the load 34 without interruption. When the battery backup 56 is directly connected to the DC bus 54 and when the power from the main AC source is interrupted, power is supplied directly from the battery backup 56 to the DC bus 54 and not through the rectifier 40. The described UPS 32 provides uninterruptible clean AC power. The voltage provided to the load 34 is regulated. The voltage provided to the DC bus 54 by the battery backup 56 may not be regulated and decreases as energy is drawn from the battery backup 56.

The input transformer 48 may isolate the main AC source from the rectifier 40. The rectifier 40 may directly receive power from the main AC source having a first AC voltage $V_{ACIN}$. The first AC voltage $V_{ACIN}$ may be referred to as the static bypass voltage. The input transformer 48 may convert the first AC voltage $V_{ACIN}$ to a transformer supply voltage (second AC voltage $V_{RECTIN}$). The second AC voltage $V_{RECTIN}$ may be less than or equal to the first AC voltage $V_{ACIN}$. The input transformer 48 may include one or more filters and/or cancel certain harmonics in the power from the main AC source. The rectifier 40 converts the second AC voltage (or transformer supply voltage) $V_{RECTIN}$ from the input transformer 48 to a DC bus voltage $V_{RECTOUT}$, which is provided to the DC bus 54.

The inverter 42 converts the DC bus voltage $V_{RECTOUT}$ (or $V_{INVIN}$) on the DC bus 54 to a third AC voltage $V_{INVOUT}$. The third AC voltage $V_{INVOUT}$ may be less than or equal to the first AC voltage $V_{ACIN}$ and equal to the second AC voltage $V_{RECTIN}$. The third AC voltage $V_{INVOUT}$ may be provided to the output transformer 50. The output transformer 50 converts the third AC voltage $V_{INVOUT}$ to an AC output voltage (fourth AC voltage) $V_{ACOUT}$, which is provided to the load 34.

The UPS 32 may operate in the bypass mode. When in the bypass mode, the control module 38 may signal the bypass circuit 46 to be in its bypass state via one or more bypass control signals BYPASS. The bypass circuit 46 is connected in parallel with the input transformer 48, the rectifier 40, the inverter 42, and the output transformer 50. The bypass circuit 46 is connected to an input 60 of the UPS 32 and/or the input transformer 48 and to an output 62 of the UPS 32 and/or the output transformer 50 and receives utility power. While in the bypass state, the bypass circuit 46 provides AC power having the first AC voltage $V_{ACIN}$ directly from the main AC source to the output 62 of UPS 32 and thus directly to the load 34. As a result, the input transformer 48, the rectifier 40, the inverter 42, and the output transformer 50 are bypassed. It should be understood that the bypass circuit 46 could be coupled to a source of AC power other than the source connected to the input of the UPS 32.

When the UPS 32 is in the UPS mode, the UPS control module 38 controls the bypass circuit 46 to be in its non-bypass state and AC power is thus not provided directly from the main AC source to the output 62 of the UPS 32. The load 34 is provided power via the rectifier 40, the inverter 42, and the transformers 48, 50.

The bypass circuit 46 may include a bypass switch 64. The bypass switch 64 may include silicon-controlled rectifiers (SCRs) and other suitable components, which may operate as switches for respective phases of AC power received from a utility source via the input 60. The bypass switch 64 may be in a CLOSED state when the UPS 32 is in the bypass mode and/or one of the economy modes, otherwise the bypass switch 64 may be in an OPEN state.

The output breaker 47 may be located between the output transformer 50 and the output 62 and/or between the inverter 42 and the output 62. The state of the output breaker 47 may be controlled by the UPS control module 38. The output breaker 47 may be in an OPEN state during the bypass mode and may be in a CLOSED state during the UPS and economy modes.

During operation in a first economy mode, the bypass switch 64 is closed and output power of an UPS 32 is provided via the bypass switch 64 to the load 34. The inverter 42 and/or the UPS control module 38 of the UPS 32 are ON and monitor the output power of the UPS 32. In the economy mode, less power is consumed by the UPS 32 than when operating in the UPS mode. This is because the rectifier 40 and the inverter 42 are operating in an idle mode. The UPS control module 38 and/or the inverter 42 may switch from operating in the economy mode to the UPS mode based on the monitored output power of the UPS 32. If the output power is noisy and/or a corresponding voltage of the output power is outside a predetermined range, the UPS control module 38 and/or the inverter 42 may switch from the economy mode to the UPS mode.

During operation in a second economy mode, the bypass switch 64 is closed and output power of an UPS 32 is provided via the bypass switch 64 to the load 34. The UPS control module 38 and/or the inverter 42 of the UPS 32 monitors the output power. Based on the output power, the inverter 42 may supply a portion of the power supplied to the load 34 to cancel harmonics in the power supplied via the bypass switch 64. The power supplied via the inverter 42 includes harmonics to cancel harmonics in the power supplied via the bypass switch 64. Although the inverter 42 consumes more power than when operating in an idle mode, the inverter 42 cleans the output power while consuming less power than when operating in the UPS mode.

The UPS 32 may also include a user interface module 70 that is in communication with the UPS control module 38 and provides input settings for system parameters. The user interface module 70 may be used to set voltage levels, current limitations, and power limitations for the devices 40, 42, 48, 50 of the UPS 32 and the AC load 34. Current and voltage levels in and out of, for example the rectifier 40, the inverter 42, and the output transformer 50 may be regulated, monitored, adjusted, and limited separately and/or independently of each other or in a dependent manner. The user interface module 70 may also be used to select automatic and manual operating modes. During the automatic mode, the UPS control module 38 may select the bypass mode and the UPS mode (normal or adaptive voltage control mode) based on states (e.g., input and output current and voltage levels) of the rectifier 40, the inverter 42 and/or the output transformer 50. During the manual mode, a user may manually select the bypass mode and the UPS mode (normal or adaptive voltage control mode).

The UPS 32 may also include a display 72, which may be used to indicate the voltage, current, and power statuses of the inputs and outputs of various devices of the UPS 32. A user may perform appropriate tasks based on the displayed information including selecting the automatic, manual, bypass, and UPS modes.

Figure 3:
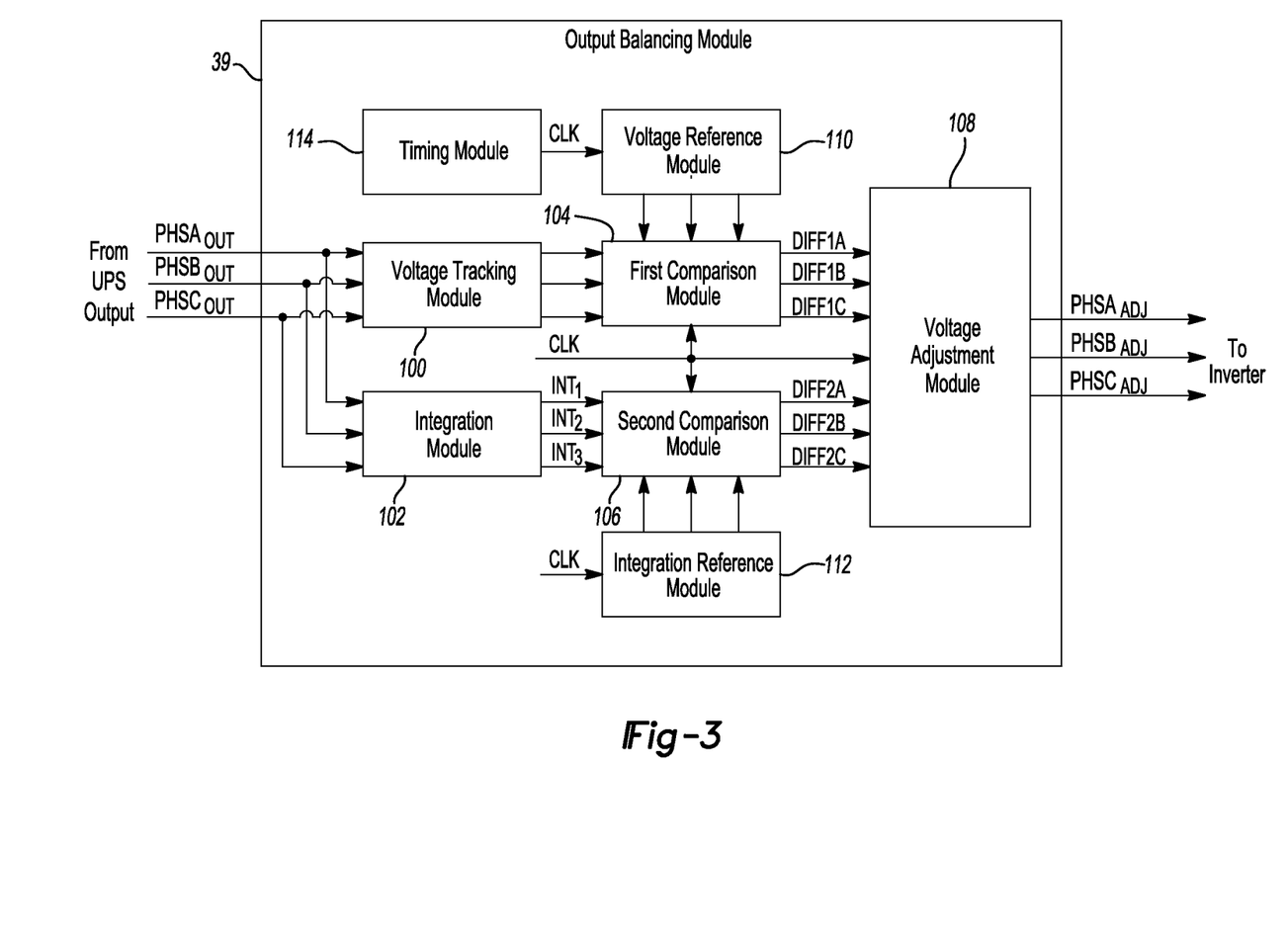
FIG. 3 is a functional block diagram of the output balancing module of FIG. 2.

Referring also to FIG. 3, the output balancing module 39 is shown. The output balancing module 39 includes a voltage tracking module 100, an integration module 102, a first comparison module 104, a second comparison module 106, and a voltage adjustment module 108. The voltage tracking module 100 tracks output phase voltages PHSA-$C_{OUT}$ of the UPS 32 and may determine magnitudes of the output phase voltages PHSA-$C_{OUT}$. The integration module 102 integrates each of the output phase voltages PHSA-$C_{OUT}$ to generate integrated signals INT1-3.

The first comparison module 104 compares reference voltages provided by a voltage reference module 110 respectively to the output phase voltages PHSA-$C_{OUT}$ and/or magnitudes of the output phase voltages PHSA-$C_{OUT}$ and generates first difference signals DIFF1A-C. The second comparison module 106 compares the integrated signals INT1-3 to respective integrated reference values received from an integration reference module 112. The integrated reference values may be results of integrating the reference voltages. The second comparison module 106 generates second difference signals DIFF2A-C based on the comparisons between the integrated signals INT1-3 and the integrated reference values (referred to as reference sums).

The voltage adjustment module 108 generates voltage adjustment signals PHSA-$C_{ADJ}$ based on respective ones of the first difference signals DIFF1A-C and the second difference signals DIFF2A-C. The voltage adjustment signals PHSA-$C_{ADJ}$ are provided to the inverter 42 and/or are used to set output voltages of the inverter 42. The output voltages of the inverter 42 may be set equal to the voltage adjustment signals PHSA-$C_{ADJ}$.

The output balancing module 39 may further include a timing module 114. The timing module 114 may generate one or more clock signals CLK, which may be provided to any and/or all of the modules of the output balancing module 39. The clock signals CLK may be synchronized with one or more phases of the input power and/or output power of the UPS 32. The modules of the output balancing module 39 may operate and/or provide respective outputs including the integrated signals INT1-3, the difference signals DIFF1A-C, DIFF2A-C, the voltage reference values, and the reference sums based on the clock signal CLK. Operation of the output balancing module 39 is further described below with respect to FIGS. 13-15.

Figure 4:
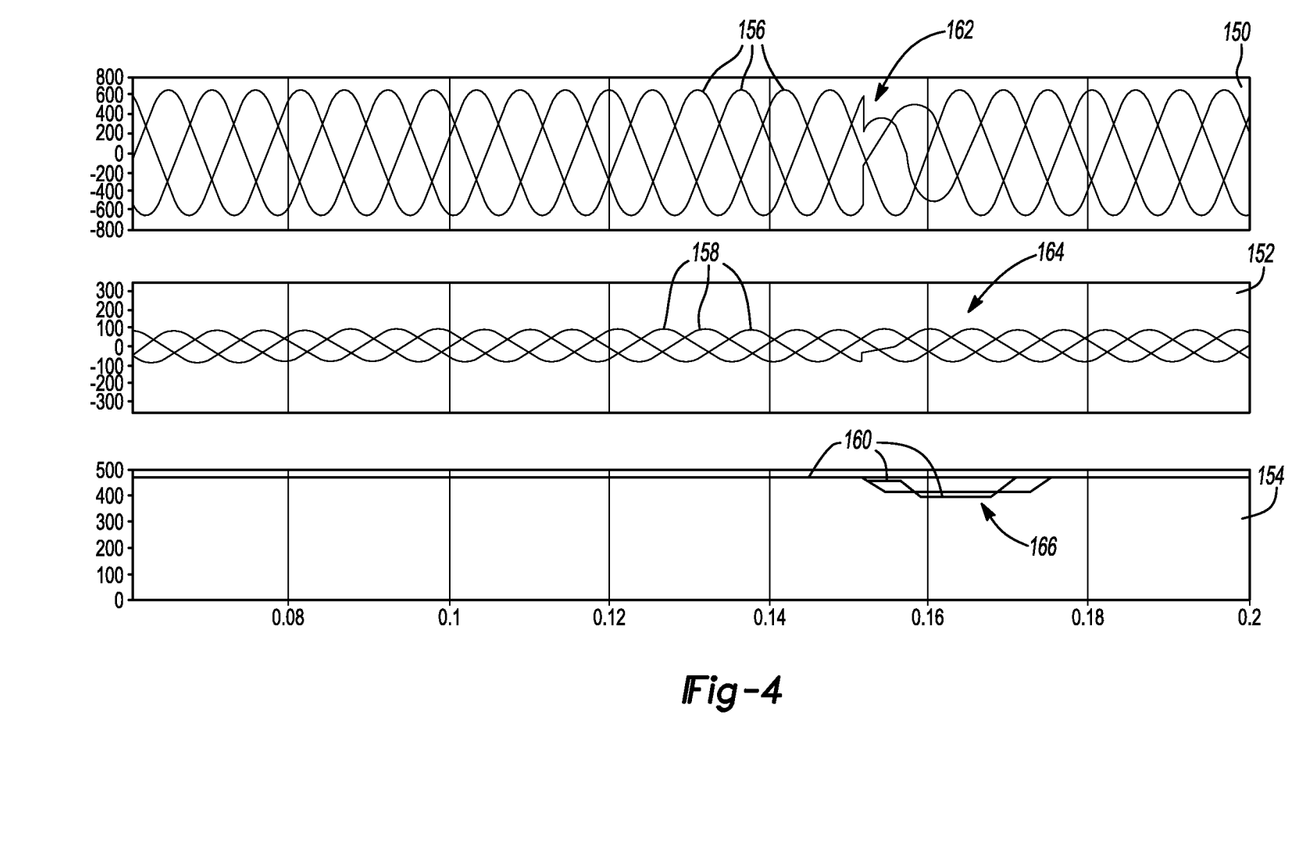
FIG. 4 includes voltage and current plots illustrating UPS output voltage and current irregularities during a transition from an economy mode to an UPS mode using the output balancing system of FIG. 3.

Referring now also to FIG. 4, voltage and current plots are shown illustrating UPS output voltage and current irregularities during a transition from one of the economy modes to the UPS mode using the output balancing module 39. The output balancing module 39 controls output voltages of the inverter 42 to balance output voltages of the UPS 32. FIG. 4 includes three plots 150, 152, 154. The first plot 150 illustrates voltage waveforms 156 for three phases of the output power of the UPS 32. The three phases are sinusoidal and 120° out-of-phase with each other. The second plot 152 illustrates corresponding output current waveforms 158 of the UPS 32 for the three phases. The third plot 154 illustrates root-mean-square (RMS) output voltage waveforms 160 of the three phases.

During the transition from the economy mode to the UPS mode, a fault (e.g., voltage line to ground short) cause disturbances in one or more of the phases such that the one or more phases temporarily do not exhibit a sinusoidal waveform. Voltage magnitudes of the one or more phases are less than voltage magnitudes typically exhibited when there is not a fault. The voltage disturbances are shown at 162. To compensate for the decrease in voltage, the output balancing module 39 balances the output voltages such that integration of the output voltages remains at predetermined values. In one implementation, the predetermined values are equal to 0.

By balancing the output voltages of the UPS 32, flux imbalances in the transformer 35 are prevented. This prevents current levels in the transformer 35 from reaching saturation current levels. This also prevents current levels of the inverter 42 from exceeding overload levels. Current levels during the transition from the economy mode to the UPS mode are shown at 164. Since the transformer 35 is not drawing increased levels of current, the UPS 32 is not overloaded and the inverter 42 is able to supply an adequate amount of current to the transformer 35. The third plot 154 illustrates that the RMS output voltages only sag for a single period of time 166. Additional voltage sag periods do not occur due to the balancing performed. In addition, the single voltage sag that does occur, may be less in magnitude than the voltage sags, which result from overloading the UPS 32.

Figure 5:
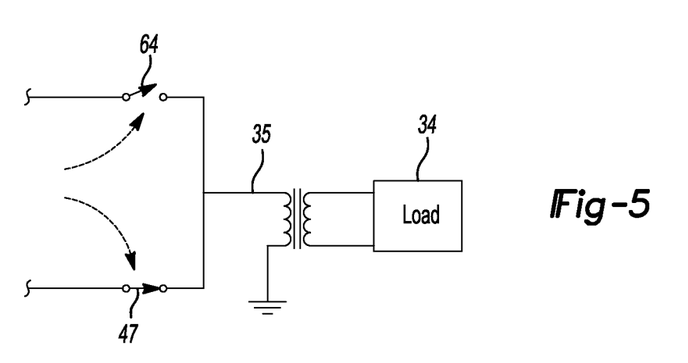
FIG. 5 is a switch diagram for the UPS system of FIG. 2 illustrating bypass switch and output breaker states while operating in the UPS mode.

In the following FIGS. 5-8, switch diagrams for the UPS system 30 of FIG. 2 are shown illustrating states of output breaker 47 and bypass switch 64 for different operating modes. In FIG. 5, states for the UPS mode are shown. The output breaker 47 is in a CLOSED state and the bypass switch 64 is in an OPEN state. Power is supplied from the inverter 42 to the load 34 via the transformer 35. This is referred to as supplying power from an UPS voltage source to the transformer 35.

Figure 6:
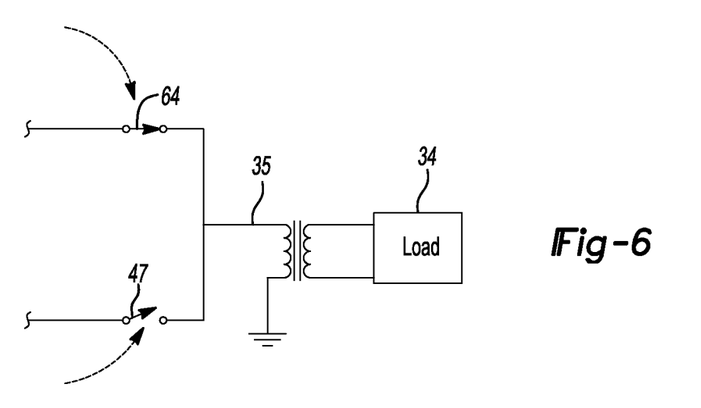
FIG. 6 is a switch diagram for the UPS system of FIG. 2 illustrating bypass switch and output breaker states while operating in a bypass mode.

In FIG. 6, states for the bypass mode are shown. The output breaker 47 is in an OPEN state and the bypass switch 64 is in a CLOSED state. Power is supplied through the bypass switch 64 to the load 34 via the transformer 35. This is referred to as supplying power from a bypass voltage source to the transformer 35.

Figure 7:
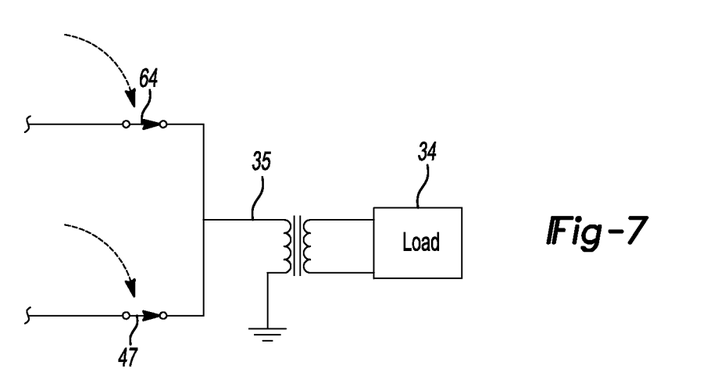
FIG. 7 is a switch diagram for the UPS system of FIG. 2 illustrating bypass switch and output breaker states while operating in the economy mode.

In FIG. 7, states for the economy mode are shown. Both the output breaker 47 and the bypass switch 64 are in CLOSED states. Power may be primarily provided via the bypass switch 64 to the transformer 35. Power may also be provided from the inverter 42 to the load 34 via the transformer 35. For example, 95-98% of the power drawn by the transformer 35 may be supplied via the bypass switch 64 while a remaining 2-5% may be provided via the inverter 42. The inverter 42 is ON and is available to provide power to the transformer 35 if a fault exists with the power supplied via the bypass switch 64. For example, if the power supplied via the bypass switch 64 is noisy, has voltages outside a predetermined range, etc. This minimizes time to transition from an economy mode to the UPS mode.

Figure 8:
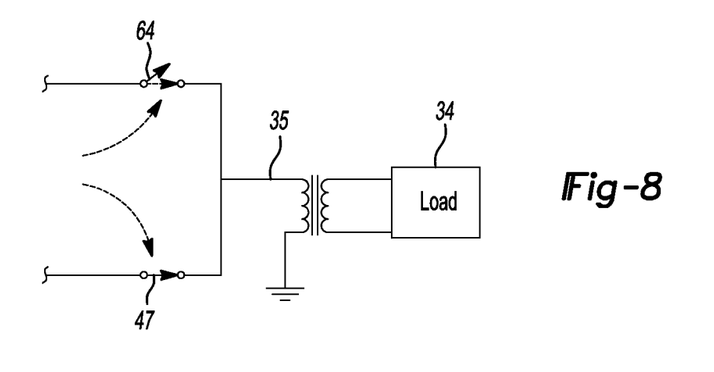
FIG. 8 is a switch diagram for the UPS system of FIG. 2 illustrating bypass switch and output breaker states while transitioning from the economy mode to the UPS mode.

In FIG. 8, states when transitioning from the economy mode to the UPS mode are shown. The output breaker 47 remains in a CLOSED state. The bypass switch 64 transitions from a CLOSED state to an OPEN state. This causes 100% of power drawn by the transformer 35 and the load 34 from the UPS 32 to be drawn from the inverter 42.

Figure 9:
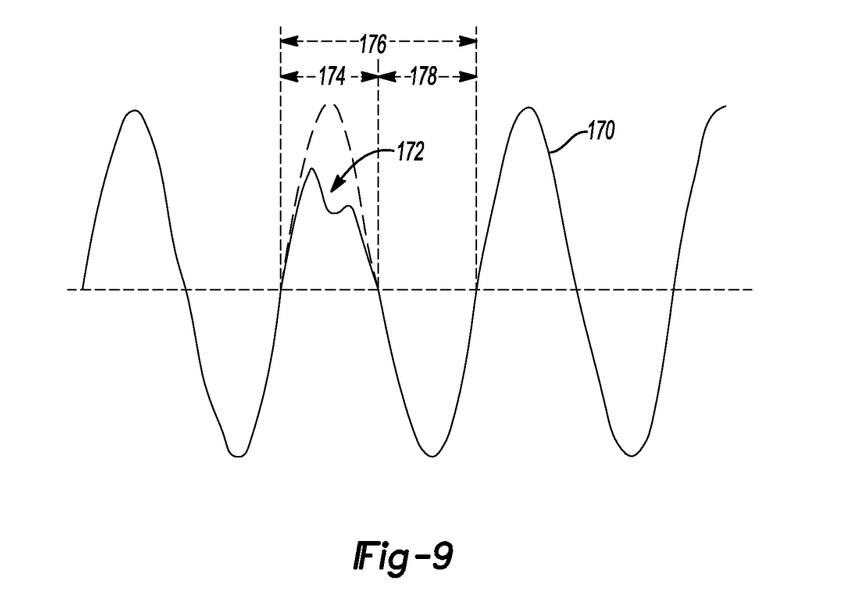
FIG. 9 is a plot of a voltage out of an UPS illustrating voltage sag during a transition between operating modes as a result of a fault.

In FIG. 9, a plot of a voltage signal 170 is shown for an output of an UPS illustrating voltage sag due to a transition from an economy mode to an UPS mode as a result of a fault. The fault is associated with a phase of a bypass circuit of the UPS. The voltage signal 170 may be for one phase of a three-phase output. The voltage sag (shown at 172) may be experienced until, for example, SCRs of a bypass switch are completely OFF and an inverter of the UPS assumes the load of the UPS (i.e. supplies the load drawn current). Volt-seconds during a positive half 174 of a cycle 176 is unbalanced relative to a volt-seconds during a negative half 178 of the cycle. Volt-seconds refers to the magnitudes of the voltage signal 170 over a period of time and are proportional to the flux of the corresponding one or more distribution transformers downstream from the UPS.

Figure 10:
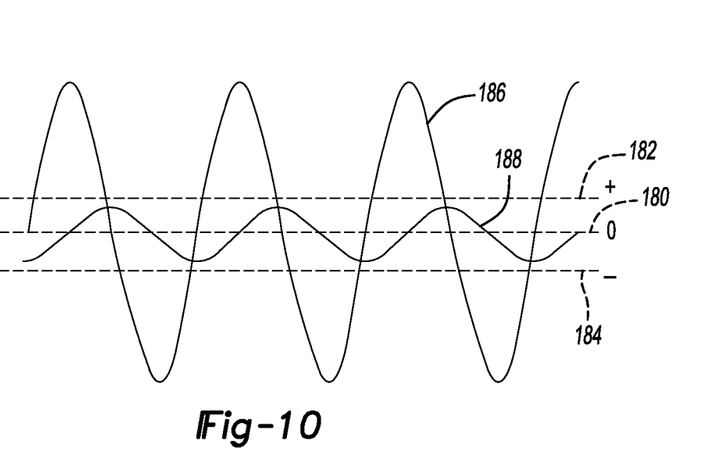
FIG. 10 includes a plot of a balanced output voltage of an UPS and a corresponding balanced plot of transformer magnetic flux.

In the following FIGS. 10-13, a zero-reference line 180 and positive and negative predetermined saturation lines 182, 184 are shown. In FIG. 10, a plot of a voltage signal 186 out of an UPS and a corresponding balanced plot of transformer flux 188 are shown. The voltage signal 186 may be for one phase of a three-phase output of the UPS. Since the voltage signal 186 is balanced above and below a reference value 0 (shown by the zero-reference line), the flux 188 of the transformer is also balanced above and below the reference value 0. In other words, the integrated sum of the voltage signal 186 for 1 cycle and/or a predetermined period is 0. The integrated sum of the flux 188 for 1 cycle and/or the predetermined period is 0. The flux 188 is proportional to an integral of the voltage signal 186.

If the flux 188 exceeds either a positive or negative saturation level, a core of the transformer becomes saturated. As a result, an impedance of a primary winding of the transformer is reduced and input current of the transformer is increased. This increase in input current can be several times a full load current of the transformer.

A magnetic field (or the flux) of the transformer is created by a voltage that is applied to the primary (input) winding of the transformer. This flux is directly proportional to the integral of the applied voltage. Since the applied voltage is an alternative current (AC) voltage, the direction of the magnetic field (flux) alternates positive and negative directions and lags the applied voltage by 90 degrees. The alternating magnetic field induces or generates an AC voltage in a secondary (output) winding of the transformer.

A transformer may be designed to accommodate a given magnitude of flux created by an applied voltage on the primary winding of the transformer. Hence, a transformer can become "saturated" with increased flux if a magnitude of the applied voltage is greater than a predetermined voltage. Also, since the flux is proportional to the integral of the applied voltage, increased flux can also be generated by an "unbalanced" (i.e. non-symmetrical) applied voltage that is not centered around 0. When flux saturation occurs, resistance of the primary winding is decreased, which can appear as a virtual short circuit to a voltage source supplying the applied voltage to the transformer. This causes an increase in current flow, possibly overloading the voltage source or UPS.

Figure 11:
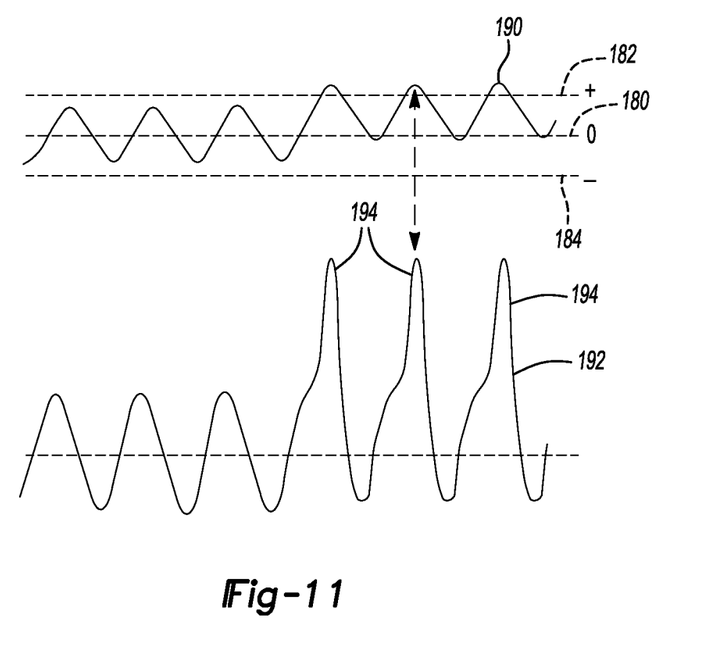
FIG. 11 includes a plot of unbalanced transformer flux and a corresponding plot of transformer current.

In FIG. 11, a plot of unbalanced transformer flux 190 and a corresponding plot of transformer current 192 are shown. The transformer flux 190 may occur due to an unbalanced output voltage of the transformer. The transformer flux 190 is not centered around 0 and is shown as exceeding a saturation level. This occurs while the transformer current 192 increases from a full load current level to a saturated current level and is also unbalanced. Saturation peak currents are designated at 194. The current exceeds a rating of the transformer when saturated.

Figure 12:
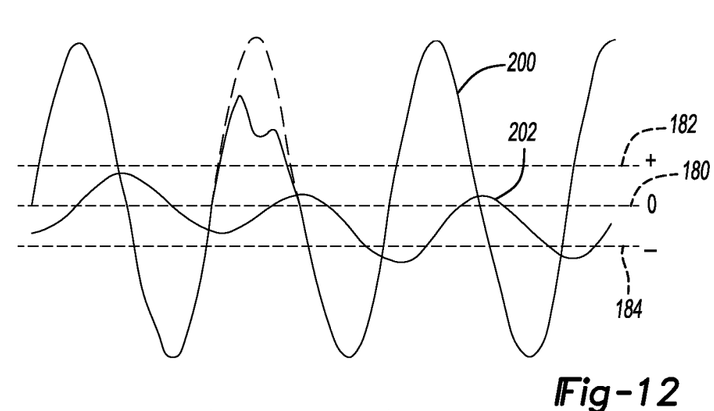
FIG. 12 includes a plot of unbalanced UPS output voltage and a corresponding plot of unbalanced transformer magnetic flux.

In FIG. 12, a plot of unbalanced UPS output voltage 200 and a corresponding plot of unbalanced transformer flux 202 are shown. The UPS output voltage 200 temporarily sags due to a phase fault and a transition from an economy mode to an UPS mode. As a result, the flux 202 of the corresponding transformer becomes unbalanced and decreases below 0. The magnitude of the flux 202 exceeds the lower saturation level 184.

Figure 13:
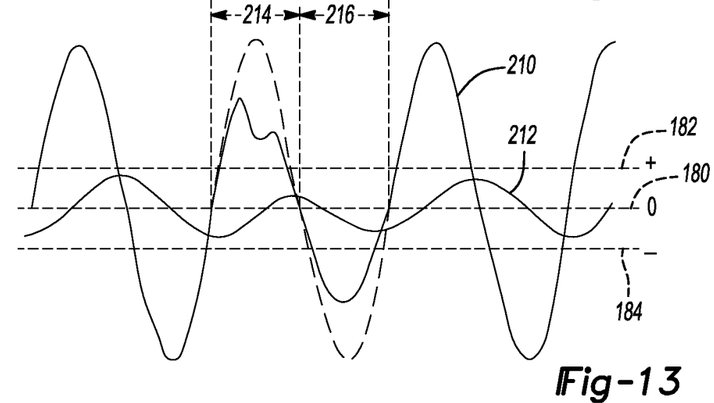
FIG. 13 includes a plot of balanced UPS output voltage and a corresponding plot of balanced transformer magnetic flux in accordance with an aspect of the present disclosure.

Referring again to FIGS. 2-3 and also to FIG. 13, a plot of balanced UPS output voltage 210 and a corresponding plot of balanced transformer flux 212 are shown. The output balancing module 39 in response to detecting the voltage sag of the output voltage for a first ½ cycle 214 of the output voltage, decreases a magnitude of the output voltage for a next ½ cycle 216 of the output voltage. The output voltage is decreased to balance the magnitudes of the integration of the output voltage above and below the reference value 0. This allows the flux to remain centered around the reference value 0, which prevents transformer flux and current saturation.

Figure 14:
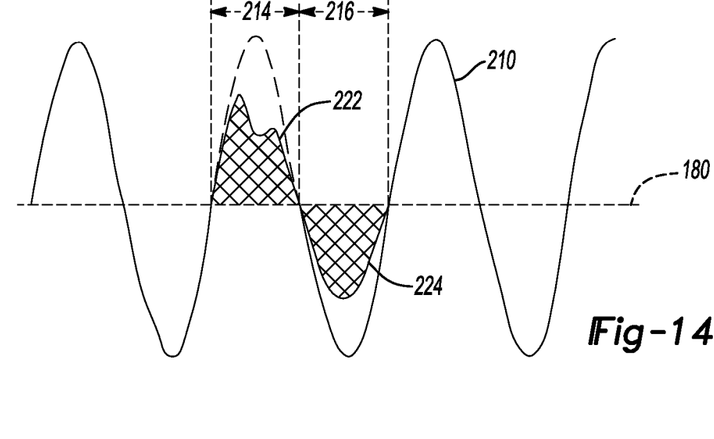
FIG. 14 includes a plot of balanced UPS output voltage of FIG. 13 including summed areas in accordance with an aspect of the present disclosure.

Referring now also to FIG. 14, a plot of the balanced UPS output voltage 210 of FIG. 13 including summed areas 222, 224 are shown. The output balancing module 39 adjusts the output voltage of the inverter 42 to cause the second area 224 between the second ½ cycle 216 and the reference line 180 to be equal in size to the first area 222 between the first ½ cycle 214 and the reference line 180. The output balancing module 39 and/or the voltage adjustment module 108 determines the first area 222 and adjusts the output voltage of the inverter 42 such that a size of the second area 224 matches the size of the first area 222.

Since the sizes of the first and second areas 222, 224 are the same, but opposite in sign, the flux created by the two ½ cycles 214, 216 balances and the resulting flux remains centered around 0. Although the above-described balancing is performed with respect to first and second ½ cycles of an output voltage, similar balancing may be performed for other portions of a cycle and/or for portions of multiple cycles such that resulting input voltages and current of a transformer and flux of the transformer are each balanced.

Figure 15:
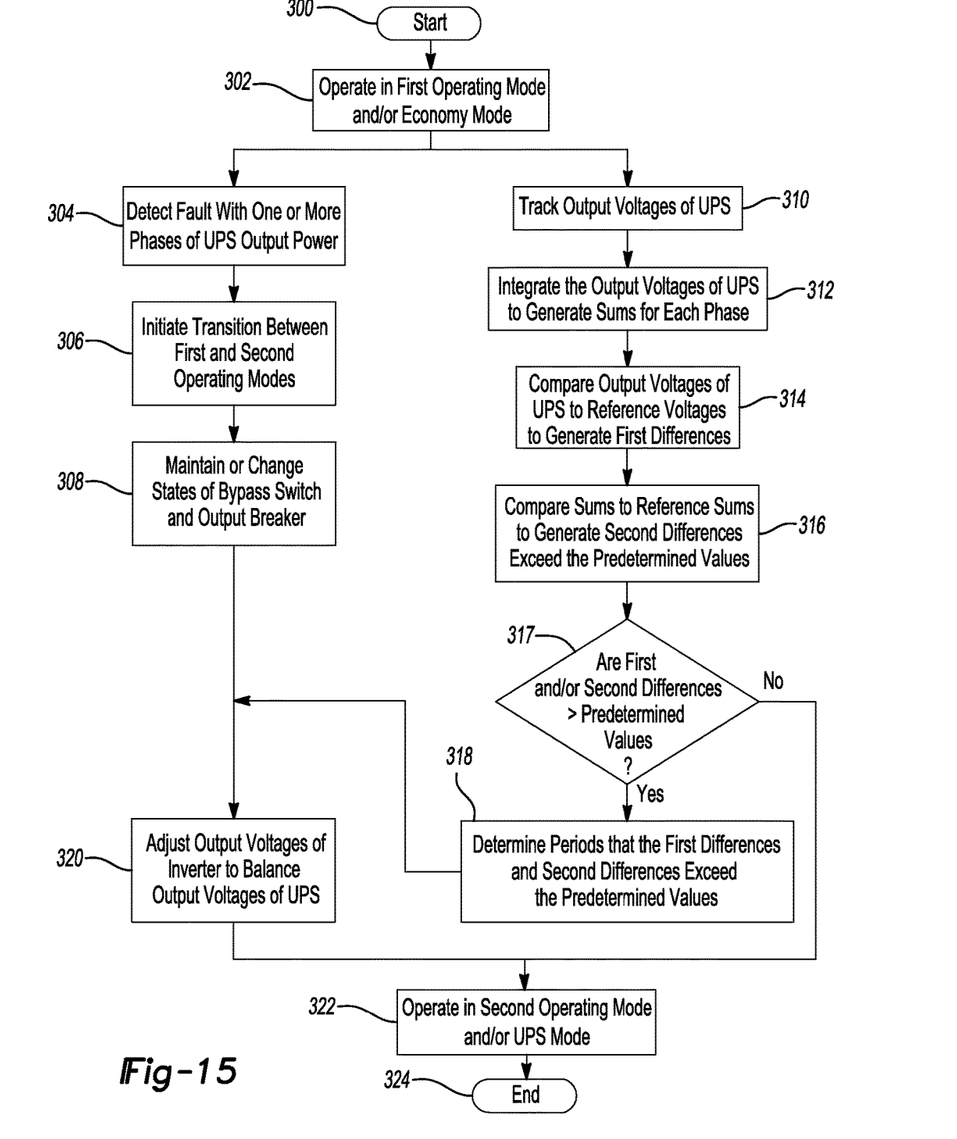
FIG. 15 is a logic flow diagram illustrating a method of operating an UPS in accordance with an aspect of the present disclosure.

The UPS systems disclosed herein may be operated using numerous methods. An example method is illustrated in FIG. 15. In FIG. 15, a logic flow diagram illustrating a method of operating an UPS is shown. Although the following tasks are primarily described with respect to the implementations of FIGS. 2-3, the tasks may be easily modified to apply to other implementations of the present disclosure. The tasks may be iteratively performed. The method may begin at 300.

At 302, the UPS 32 is operating in a first operating mode or an economy mode (e.g., one of the above-described economy modes). The input 60 of the UPS 32 receives a first power to supply the transformer 35 and/or the load 34. The first power is supplied via the bypass circuit 46 to the output 62. The bypass switch 64 and the output breaker 47 are in CLOSED states. The input 60 also receives a second power to power the rectifier 40 and the inverter 42. The second power is provided to the rectifier 40 and the inverter 42. The inverter 42 receives the second power and not the first power when in the economy mode. The bypass is turned on to supply the first power to the output 62 of the UPS 32 when operating in the economy mode.

Subsequent to performing task 302, the following tasks 306-308 may be performed in parallel with tasks 310-318.

At 304, the UPS control module 38 is configured to detect a fault with the first power and/or output power at the output 62 of the UPS 32. The UPS control module 38 may generate a fault signal in response to the detected fault.

At 306 and for the example economy mode to UPS mode transition described, the UPS control module 38 may initiate a transition from the economy mode to the UPS mode in response to the detected fault and/or fault signal. The UPS mode may be referred to as the second operating mode. This may include generating a control signal to change state of the bypass switch 64. If a transition is being performed between other operating modes of the UPS 32, control signals may accordingly be generated to change and/or maintain states of the bypass switch 64 and the output breaker 47.

At 308 and for the economy mode to UPS mode transition described, the bypass circuit 46 and the inverter 42 may be transitioned from operating in the economy mode to operating in the UPS mode in response to the detected fault. The bypass switch 64 may be transitioned to an OPEN state and the output breaker 47 may be maintained in a CLOSED state. If a transition is being performed between other operating modes of the UPS 32, the bypass switch 64 and the output breaker 47 may be maintained in a current OPEN or CLOSED state or may be transitioned to the appropriate OPEN or CLOSED states. The states for the bypass switch 64 and the output breaker 47 for other operating modes are provided above.

At 310, the voltage tracking module 100 tracks output voltages at the output 62 of the UPS 32. At 312, the integration module 102 integrates the output voltages to generate integrated sums for each phase of the output power of the UPS 32. This may be indicated via the integrated signals INT1-3. A sum of each phase may be for one or more portions of one or more cycles of that phase. The sum may be provided at an end of the one or more portions. A length of time associated with the one or more portions may be referred to as a first period. As a result, each of the three phases may have a respective one of the first periods. The first periods of the three phases may be the same or different in length.

At 314, the first comparison module 104 compares the output voltages for each phase to reference voltages from the voltage reference module 110 and generates the first difference signals DIFF1A-C. The first difference signals DIFF1A-C may be determined for the first periods. At 316, the second comparison module 106 compares the sums of the integrated signals INT1-3 to reference sums received from the integration reference module 112 and in response generates the second difference signals DIFF2A-C. The second difference signals DIFF2A-C may be determined for the first periods.

At 317, the voltage adjustment module 108 determines whether one or more of the first differences DIFF1A-C and/or the second differences DIFF2A-C exceed respective predetermined values over the first periods. If one or more of the differences DIFF1A-C, DIFF2A-C exceeds a predetermined value, task 318 is performed, otherwise task 322 may be performed.

At 318, the voltage adjustment module 108 may determine second periods that one or more of the first differences and/or the second differences exceed respective predetermined values. Each of the second periods may be the same length as or may be shorter than a corresponding one of the first periods. The second periods indicate lengths of time for which voltage balancing is to be performed. When one or more of the differences exceeds a respective predetermined value, voltage balancing is to be performed to compensate for these differences. Task 318 may be performed while performing tasks 314-316.

At 320, the voltage adjustment module 108 adjusts the voltages out of the inverter 42 based on the differences DIFF1A-C, DIFF2A-C and the second periods. The output voltages of the one or more phases, for which the corresponding differences have exceeded the respective predetermined values, are adjusted. The output voltages are adjusted for respective third periods, which may be equal to or different in length than the second periods. Each of the third periods may begin at an end of a corresponding one of the second periods. The output voltages of the inverter 42 are adjusted to balance the output voltages of the UPS 32.

For each of the output voltages of the UPS 32 that are to be balanced, the corresponding output voltage of the inverter 42 is adjusted. The output voltage of the inverter 42 is adjusted such that the corresponding output voltage of the UPS 32 is balanced. The output voltage (or output voltage signal) of the UPS 32 is balanced such that a first area between the output voltage signal and a reference value for one of the second periods is equal to a second area between the output voltage signal and the reference value for the third period. The output balancing module 39 may return to task 310 subsequent to task 320 to verify that the output voltages of the UPS 32 are balanced or may proceed to task 322 as shown.

At 322, the UPS 32 operates in the second operating mode and/or UPS mode and the power supplied to the output 62 is provided via the inverter 42. The output balancing module 39 ceases to adjust the output voltages of the inverter 42. The method may end at 324.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. An uninterruptible power supply (UPS) comprising:
an input configured to (i) receive first power from a utility source to power at least one load, and (ii) receive second power from the utility source, wherein the at least one load is separate from the UPS;
an inverter configured to receive (i) when in a first mode, the first power and the second power, and (ii) when in a second mode, the second power and not the first power, wherein the second power is used to power the inverter;
a bypass circuit connected to the input and configured to bypass the inverter to supply the first power to an output of the UPS when operating in the second mode; and
a control module configured to (i) detect a variable voltage at the output of the UPS a first plurality of times to provide a first plurality of voltages, (ii) Integrate the first plurality of voltages to generate a first sum, and (iii) subsequent to completing a transition from the second mode to the first mode, adjust an output voltage of the inverter based on the first sum to balance the variable voltage of the UPS, wherein the variable voltage of the UPS is provided based on the output voltage of the inverter.

2. The UPS of claim 1, wherein the bypass circuit does not bypass the inverter or provide the first power to the output of the UPS when in the first mode.

3. The UPS of claim 1, wherein the inverter is a direct current to alternating current converter.

4. The UPS of claim 1, wherein the control module is configured to (i) compare the variable voltage of the UPS to a reference voltage, and (ii) adjust the output voltage of the inverter based on the comparison.

5. The UPS of claim 1, wherein the control module is configured to (i) compare the first sum to a reference sum, and (ii) adjust the output voltage of the inverter based on the comparison.

6. The UPS of claim 1, wherein:
the first power includes a first phase, a second phase and a third phase; and
the control module is configured to
integrate the first plurality of voltages of the first Phase to generate the first sum,
integrate a second plurality of voltages of the second phase to generate a second sum,
integrate a third plurality of voltages of the third phase to generate a third sum,
compare the first sum, the second sum, and the third sum respectively to a first reference sum, a second reference sum, and a third reference sum, and
adjust each of three phases of power at an output of the inverter based on a respective one of the comparisons.

7. The UPS of claim 1, wherein the control module is configured to (i) determine the first sum at an end of a first portion of a cycle of the variable voltage of the UPS, (ii) compare the first sum to a reference sum, and (iii) based on the comparison, adjust the output voltage of the inverter during a second portion of the cycle of the variable voltage of the UPS.

8. The UPS of claim 1, wherein the control module is configured to (i) determine the first sum at an end of a first portion of a cycle of the variable voltage of the UPS, and (ii) based on the first sum, adjust the output voltage of the inverter such that at an end of a second portion of the cycle or at an end of a portion of a next cycle the first sum is equal to a reference sum.

9. The UPS of claim 1, wherein the control module is configured to:
determine a first period that at least one of (i) a difference between the variable voltage of the UPS and a reference voltage is greater than a first predetermined value, or (ii) a difference between the first sum and a reference sum is greater than a second predetermined value; and
adjust the output voltage of the inverter for a second period, wherein the second period begins at an end of the first period, and wherein a length of the first period is equal to a length of the second period.

10. The UPS of claim 9, wherein the control module is configured to:
detect the variable voltage at the output of the UPS a second plurality of times to provide a second plurality of voltages; and
adjust the output voltage of the inverter such that an integrated sum of the first plurality of voltages of the UPS for the first period is equal to an integrated sum of the second plurality of voltages of the UPS for the second period.

11. The UPS of claim 1, wherein the control module is configured to adjust the output voltage of the inverter such that the first sum is equal to a predetermined value.

12. The UPS of claim 1, wherein the control module is configured to (i) determine a sum for a first ½ of a cycle of the variable voltage of the UPS, and (ii) adjust the variable voltage for a second ½ of the cycle of the variable voltage of the UPS.

13. The UPS of claim 1, further comprising a rectifier configured to receive the first power and the second power and convert an alternating current to a direct current,
the inverter is configured to convert the direct current to an alternating current.

14. The UPS of claim 13, further comprising a backup power source, wherein:
the control module is configured to (i) detect a fault with the first power, and (ii) generate a fault signal; and
the inverter is configured to supply power from the backup power source to the at least one load based on the fault signal.

15. The UPS of claim 1, wherein the control module is configured to (i) detect a fault with the first power and (ii) transition the bypass circuit and the inverter from operating in the second mode to operating in the first mode in response to the detected fault.

16. A method of operating an uninterruptible power supply (UPS), the method comprising:
receiving first power from a utility source at an input of the UPS to power at least one load, wherein the at least one load is separate from the UPS;
receiving second power at the input from the utility source;
receiving, via an inverter, (i) the first power and the second power when in a first mode, and (ii), the second power and not the first power when in a second mode, wherein the second power is used to power the inverter;
bypassing the inverter to supply the first power to an output of the UPS when operating in the second mode;
detecting a variable voltage at the output of the UPS a first plurality of times to provide a first plurality of voltages;
integrating the first plurality of voltages to generate a first sum; and
subsequent to completing a transition from the second mode to the first mode, adjusting an output voltage of the inverter based on the first sum to balance the variable voltage of the UPS, wherein the variable voltage of the UPS is provided based on the output voltage of the inverter.

17. The method of claim 16, wherein the first power includes a first phase, a second phase and a third phase, and the method further comprises:
integrating the first plurality of voltages of the first phase to generate respectively the first sum;
integrating a second plurality of voltages of the second phase to generate a second sum;
integrating a third plurality of voltages of the third phase to generate a third sum;
comparing the first sum, the second sum, and the third sum respectively to a first reference sum, a second reference sum, and a third reference sum; and
adjusting each of three phases of power at an output of the inverter based on a respective one of the comparisons.

18. The method of claim 16, further comprising:
determining the first sum at an end of a first portion of a cycle of the variable voltage of the UPS;
comparing the first sum to a reference sum; and
based on the comparison, adjusting the output voltage of the inverter (i) during a second portion of the cycle of the variable voltage of the UPS, and (ii) beginning at the end of the first portion.

19. The method of claim 16, further comprising:
determining the first sum at an end of a first portion of a cycle of the variable voltage of the UPS; and
based on the first sum, adjusting the output voltage of the inverter such that at an end of a second portion of the cycle or at an end of a portion of a next cycle the first sum is equal to a reference sum.

20. The method of claim 16, further comprising:
determining a first period that at least one of (i) a difference between the variable voltage of the UPS and a reference voltage is greater than a first predetermined value, or (ii) a difference between the first sum and a reference sum is greater than a second predetermined value, wherein the first plurality of voltages are detected during the first period;
during a second period, detect the variable voltage at the output of the UPS a second plurality of times to provide a second plurality of voltages;
adjusting the output voltage of the inverter for the second period, wherein the second period begins at an end of the first period, and wherein a length of the first period is equal to a length of the second period; and
adjusting the output voltage of the inverter such that the first sum is equal to an integrated sum of the second plurality of voltages.

21. The UPS of claim 1, wherein:
the first power is a first portion of power received from the utility source at the input; and
the second power is a second portion of the power received from the utility source at the input.

22. The UPS of claim 1, wherein the control module is configured to adjust the variable voltage, such that an area between positive voltages out of the UPS and zero is equal to an area between negative voltages out of the UPS and zero.

23. The UPS of claim 22, wherein the control module is configured to adjust the variable voltage to balance the variable voltage of the UPS due to at least one of (i) a fault, or (ii) a disturbance in the variable voltage during a transition between the first mode and the second mode.

* * * * *